(12) United States Patent
Miklo et al.

(10) Patent No.: US 6,267,139 B1
(45) Date of Patent: Jul. 31, 2001

(54) VALVE ARRANGEMENT

(75) Inventors: Jurgen Miklo, Thayngen; Walter Schapper, Buchs, both of (CH)

(73) Assignee: Georg Rohrleitungssysteme Ag, Schaffhausen (CH)

( * ) Notice: Subject to any disclaimer, the term of this patent is extended or adjusted under 35 U.S.C. 154(b) by 0 days.

(21) Appl. No.: 09/551,426

(22) Filed: Apr. 18, 2000

(30) Foreign Application Priority Data

Apr. 20, 1999 (DE) .............................................. 199 17 698

(51) Int. Cl.[7] .................................................. F16K 37/00
(52) U.S. Cl. ...................................... 137/554; 251/129.12
(58) Field of Search .................................. 137/554, 553; 251/129.12, 129.11

(56) References Cited

U.S. PATENT DOCUMENTS

| | | | |
|---|---|---|---|
| 3,189,700 | * | 6/1965 | Eidson .............................. 137/554 X |
| 5,305,781 | | 4/1994 | Raymond, Jr. et al. . |
| 5,325,888 | * | 7/1994 | Stary ..................................... 137/553 |
| 6,079,442 | * | 6/2000 | Raymond, Jr. et al. ............. 137/554 |

FOREIGN PATENT DOCUMENTS

| | | |
|---|---|---|
| 631532 | 8/1982 | (CH) . |
| 2856766 | 7/1980 | (DE) . |
| 3900866 | 7/1990 | (DE) . |
| 4308938 | 9/1993 | (DE) . |
| 0872676 | 10/1998 | (EP) . |
| 2714955 | 7/1995 | (FR) . |

* cited by examiner

Primary Examiner—Kevin Lee
(74) Attorney, Agent, or Firm—Bachman & LaPointe, P.C.

(57) ABSTRACT

A valve arrangement with at least two connecting regions and with an actuating device is proposed, the valve body having a lead-through region for guiding a spindle and a receiving housing which encloses at least the lead-through region of the valve body being provided for receiving the means for sensing the valve position. The receiving housing, which can be easily adapted to the respective field of use, can be integrated in a simple manner in existing valve arrangements and the compact and flexible arrangement of the means for sensing the valve position in the receiving housing ensures to an increased extent that the valve position will be correctly indicated.

21 Claims, 4 Drawing Sheets

VALVE ARRANGEMENT

BACKGROUND OF THE INVENTION

The present invention relates to a valve arrangement comprising a valve body with at least two connecting regions for connection to the matching pipelines and with a shut-off element for shutting off or opening the pipeline, the valve body having a lead-through region for guiding a spindle, which is arranged such that it can be connected effectively at a first end to the shut-off member and at the second end to an actuating device, and with at least one means for sensing the respective valve position being provided.

EP 0 872 676 A2 discloses a valve arrangement of the generic type with an electronic means for continuously sensing and controlling the valve position. The valve arrangement has a spindle between the valve body and the manual actuating wheel. The spindle is connected to the shut-off element by means of a pin. The spindle is connected at its upper end to a bushing, which surrounds the spindle over an extended region. In a middle region of the bushing, a gearwheel is connected to the bushing. The electronic means has a further gearwheel, which is in engagement with the gearwheel of the bushing. The arrangement has a relatively large spindle in relation to the pipeline diameter and comprises many individual parts, which have to be connected to one another in order to ensure reliable functioning.

In a range of valve arrangements for different diameters, all the parts which are connected directly or indirectly to the spindle have to be adapted in their dimensions to the dimensions and to the media throughput of the pipeline.

On the basis of this prior art, it is the object of the invention to specify a valve arrangement in which the valve position can be sensed with as few individual parts as possible, as directly as possible and without the risk of erroneous indications.

SUMMARY OF THE INVENTION

This foregoing object is achieved by a valve arrangement comprising a valve body with at least two connecting regions for connection to the matching pipelines and with a shut-off element for shutting off or opening the pipeline, the valve body having a lead-through region for guiding a spindle, which is arranged such that it can be connected effectively at a first end to the shut-off member and at the second end to an actuating device, and with at least one means for sensing the respective valve position being provided, a receiving housing for receiving the means for sensing the respective valve position enclosing at least the lead-through region.

It is advantageous that the valve arrangement with the means for sensing the valve position forms a unit which is as compact and stable as possible. This is achieved by the receiving housing enclosing the valve body in the lead-through region of the spindle and having an essentially concavely shaped base and by being arranged in such a way that it can be positively connected to an outer wall region of the valve body.

It is also advantageous that the valve arrangement can optionally be used with manual actuation or with motorized actuation. This is achieved by the receiving housing having on the side opposite the base a flange for connection to further flanges.

It is also advantageous that the means for sensing the valve position takes up as little space as possible in the valve arrangement. This is achieved by arranging in the receiving housing a control plate with control cams for activating the means for sensing the respective valve position. This is also achieved by providing in the flange a recess for receiving the control plate, the said recess being in the form of an arc of a circle and coinciding with the outside diameter of the control plate.

It is also advantageous that, in the valve arrangement, the means for sensing the valve position is connected as directly as possible to the already existing components of the valve arrangement. This is achieved by the control plate having for coupling with the rotary movement of the spindle or the actuating device a coupling lug which interacts with a groove in the spindle or with a groove in the actuating device.

It is also advantageous that the valve arrangement has a long service life. This is achieved by concavely shaped switching lugs being arranged between the control cams of the circular control plate and the microswitches in such a way that the circular movement of the control cams is converted into a rectilinear switching path of the microswitches.

The placement of the receiving housing with the control plate and the means for sensing the valve position directly next to the region of the valve body in which the spindle is led out of the valve body makes it possible on the one hand to utilize the space between the valve body and the actuating element in a meaningful way and on the other hand to obtain a stable and compact arrangement.

The valve position is not detected from the actuating element or from the motorized actuation but is sensed without interposed parts in the region in which the movement of the spindle is most likely to coincide with the movement of the shut-off element. If there is a defect in the connection between the spindle and the actuating element or if the spindle is ruptured in the upper region, the actual valve position would not be sensed, but instead the position of the actuating element. The receiving housing can be added to existing valve arrangements without modifications.

BRIEF DESCRIPTION OF THE DRAWINGS

Exemplary embodiments of the invention are described with reference to the figures, in which.

DETAILED DESCRIPTION

Figure 1:
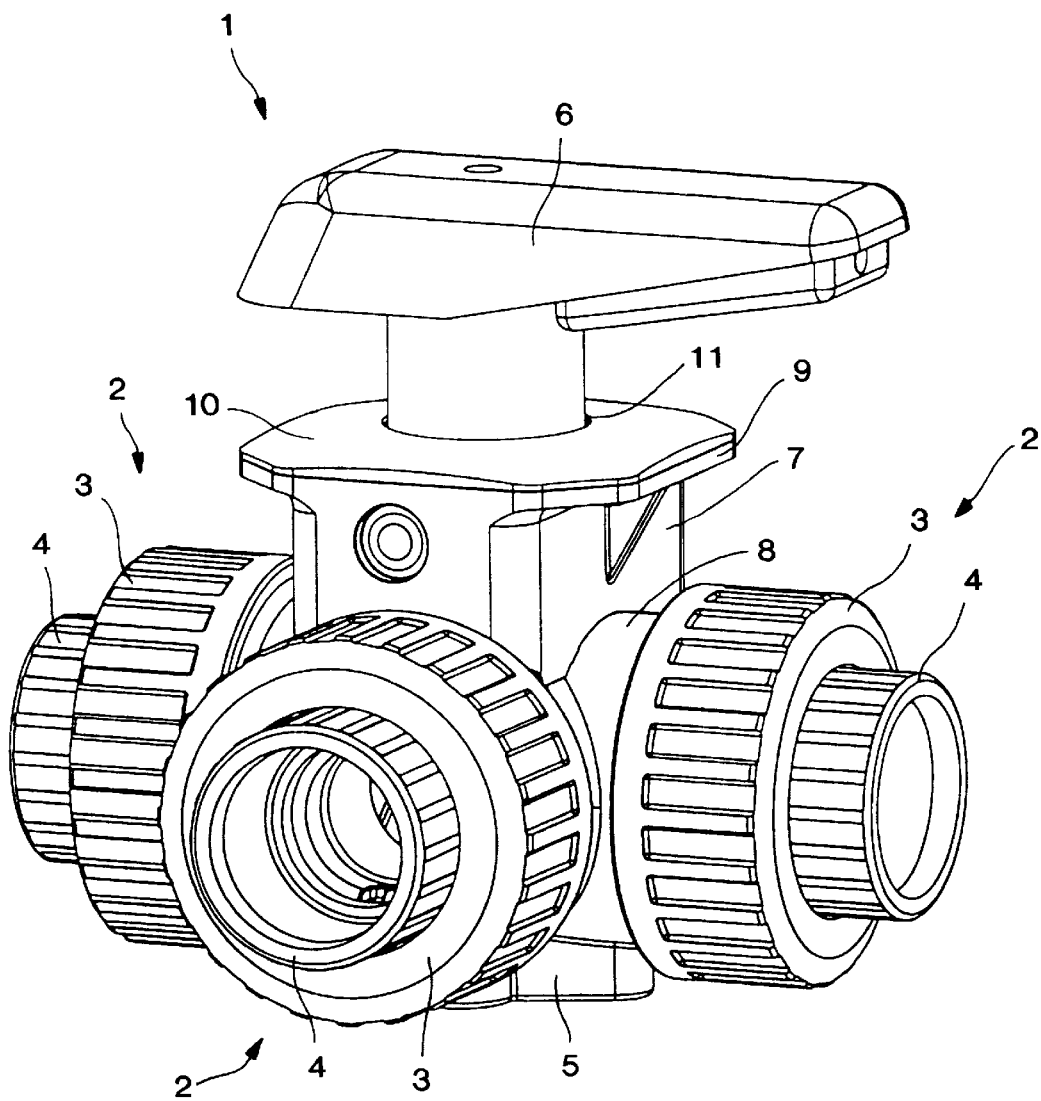
FIG. 1 shows a perspective view of a valve arrangement with three connecting regions and with manual actuation.

In FIG. 1, a valve arrangement 1 with three connecting regions 2 is represented. The connecting regions 2 are represented as union nuts 3, which can be connected to a valve body 5 by means of a sealing region of the flange bushings 4 fitting in said nut. The valve body 5 essentially comprises a T-shaped tube, with a shut-off element (not represented here) being provided at the crossing point of the T in the interior of the tube for shutting off or opening the pipelines to be connected. The valve arrangement 1 represented in FIG. 1 is produced from plastic. However, other materials, such as metal or glass, are also possible. The shut-off element may be of any known design, for example, as a slide or as a rotary body. Similarly, the design of the connecting regions 2 with sealing regions and union nuts 3 is merely an example and other possible designs may be used.

The shut-off element in the interior of the valve body 5 is connected via a spindle (15 in FIG. 3) to an actuating device, here a handle 6. Arranged directly above the crossing point of the T-shaped valve body is a receiving housing 7 with the valve body 5. The receiving housing 7 encloses the region in which the spindle leads out of the valve body 5 and has a base which is curved in such a way that the receiving housing can be positively connected to an outer wall region 8 of the valve body 5. The connection between the receiving housing 7 and the valve body 5 may be established by means of welding, screwing or by means of an adhesive.

Figure 3:
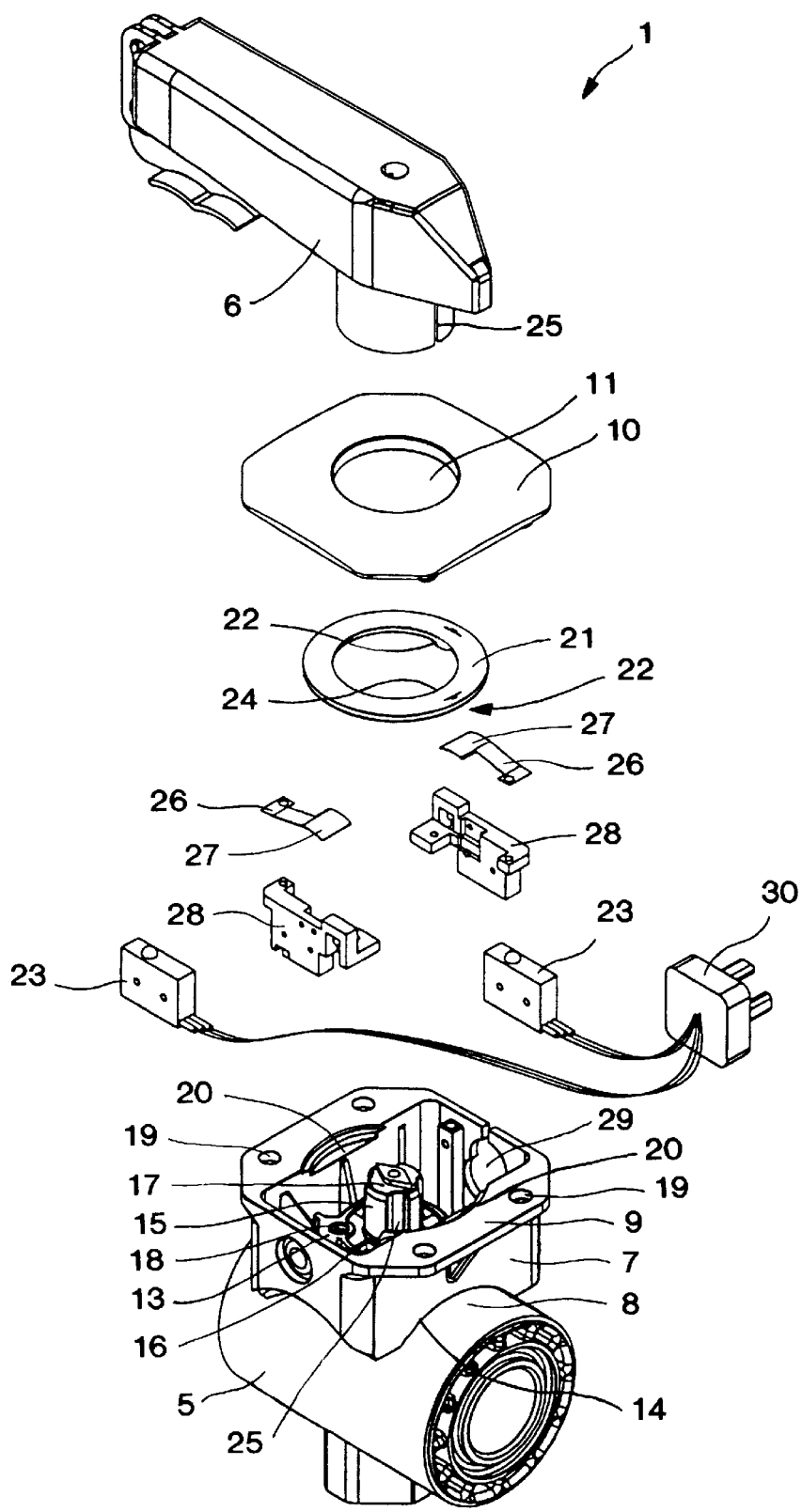
FIG. 3 shows a perspective and regional exploded representation of a valve arrangement according to the invention, in which the connecting regions have been omitted.

As described in FIG. 3, the spindle 15 of the valve body 5 leads from a first end, which is connected to the shut-off element (not shown) in the valve body 5, to a second end, which is connected to the actuating device 6. The spindle is arranged completely or largely inside the receiving housing 7.

On the side remote from the valve body and arranged opposite the curved base, the receiving housing 7 has a flange 9. In the case of the manually actuated actuating device of FIG. 1, the receiving housing 7 is closed off by a top plate 10 with an opening 11, through which the handle 6 for fastening to the spindle is led. However, as described below with respect to FIG. 2, further flanges may also be connected to the flange 9.

Figure 2:
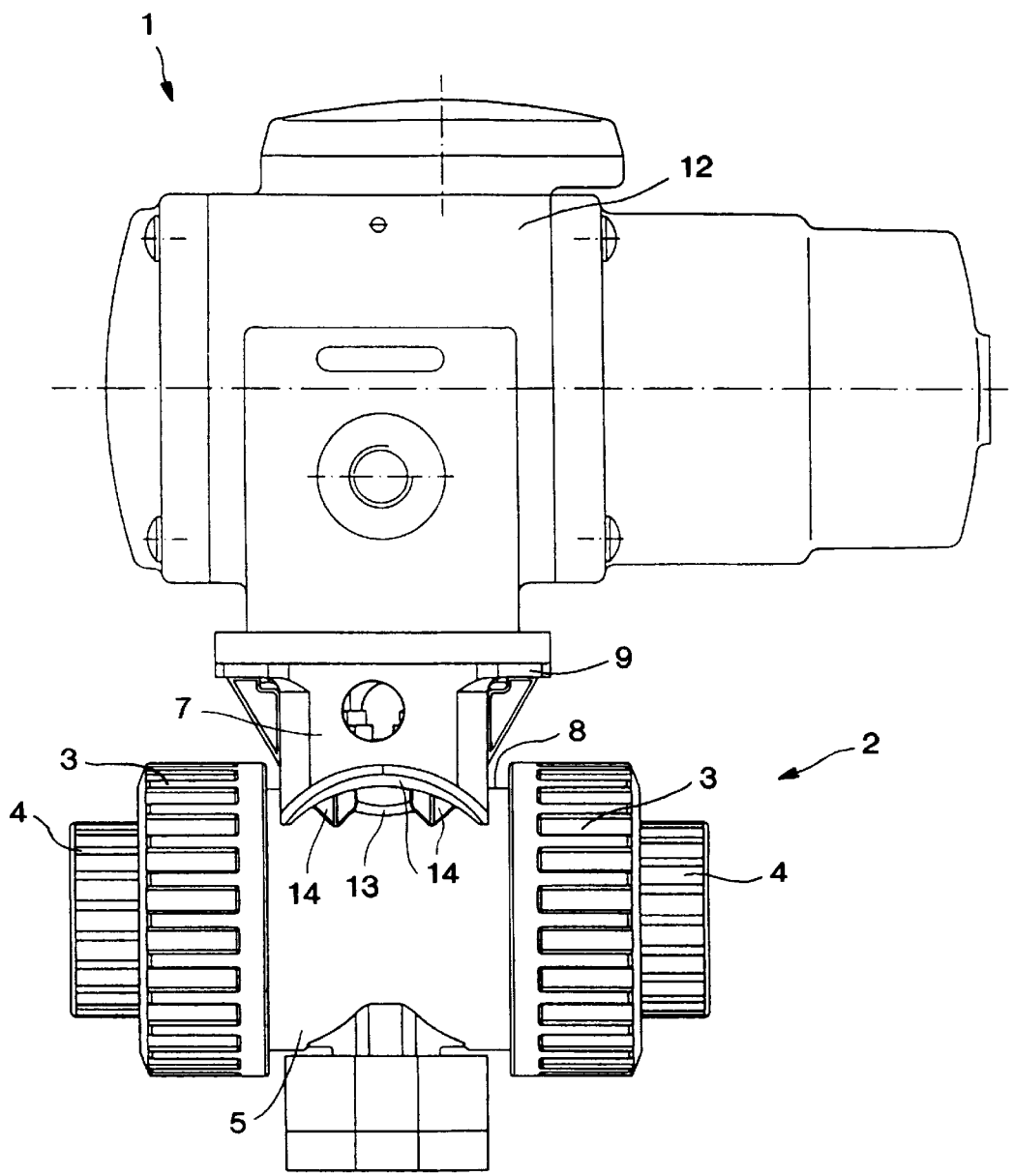
FIG. 2 shows a side view of a valve arrangement with two connecting regions and with motorized actuation.

In FIG. 2, a valve arrangement with an actuating device actuated by a motor 12 is represented. In contrast with FIG. 1, the valve body 5 of FIG. 2 has merely two connecting regions 2. It can be seen in FIG. 2 how the base 13 of the receiving housing 7 is formed with curvatures 14. Two curvatures 14, which are represented in FIG. 2 in side view as wedge-shaped positioning ribs, are formed to coincide with the curvature of the outer wall region 8 of the valve body 5. A further curvature 14, which is represented in plan view in FIG. 2, is provided for the valve body of a three-way valve arrangement, as shown in FIG. 1. This indicates that a single receiving housing 7 can be used for a plurality of valve arrangements 1 for the same pipe diameter. Instead of the top plate 10 of FIG. 1, in the arrangement of FIG. 2 the receiving housing 7 was connected to the motor 12. By forming the receiving housing 7 with the flange 9, the same receiving housing 7 can be used both for motorized operation and for manual operation. For this purpose, the dimensions of the flange 9 are fixed to coincide with the known standard dimensions of motorized actuating devices.

In FIG. 3, the valve arrangement from FIG. 1 is represented before assembly. For a better overview, the connecting regions 2 have been omitted from the valve body 5. The receiving housing 7 is positively connected in the region of the curvatures 14 to the outer wall region 8 of the valve body 5. In the interior of the receiving housing 7, the spindle 15 is visible. The spindle 15 leads through a lead-through region 16 in the interior of the valve body 5. Provided in the lead-through region 16 are also the necessary seals for sealing off the pumping medium. The spindle 15 is connected by a first end to the shut-off element. The spindle is connected by the second end 17 to the actuating device 6. The receiving housing 7 also has screw holes 18 at the base 13. This indicates that the receiving housing 7 can be connected to the valve body 5 by means of screws in the lead-through region 16 for the spindle 15. The upper side of the receiving housing 7, which is facing away from the valve body 5, is designed as a flange 9. The flange 9 has further screw holes 19, which are provided for fastening the top plate 10 or the motor 12.

In the flange 9 there can be seen two recesses 20, which are arranged on opposite sides of the flange and are in the form of arcs of a circle. A control plate 21 fits into these recesses 20. The diameter of the circle of the arc of the recesses 20 essentially coincides with the outside diameter of the control plate 21 in such a way that the latter is rotatably guided in the recesses 20. The control plate 21 takes up just enough space in the recesses in the flange 9 for the control plate to be adequately guided during the rotary movement. This does not significantly weaken the flange 9. The control plate 21 may also be arranged in a lower region of the side walls of the receiving housing 7.

The control plate 21 is flat on the upper side, so that, once it has been placed into the recesses of the flange 9, it does not project and is not hindered in rotary movement when assembled with a further flange of a motor housing. On the underside, the control plate 21 has control cams 22. In FIG. 3, two control cams 22 are provided at an arc spacing of 90°, here coinciding with the rotary movement of the spindle of a ball cock and consequently coinciding with the pivoting movement of the handle 6. Depending on the type of valve arrangement 1, there may also be a plurality of control cams formed at different arc spacings. The control cams 22 serve for activating a means for sensing the valve position, here represented as a microswitch 23. The control cam 21 may be produced from a plastic, optionally reinforced with glass fibers, in an injection-molding process or from some other combination of materials.

Formed on the inside diameter of the control plate 21 is a coupling lug 24, which interacts with a groove 25 on the spindle 15 or with a groove on the actuating device 6, which is connected in this region to the spindle 15. By the interaction of the groove 25 and the coupling lug 24, the movement of the spindle 15 is transferred to the control plate 21.

Arranged between the control cams 22 of the circular control plate 21 and the microswitch 23 are switching lugs 26. The switching lugs 26 have a concavely shaped region 27. This achieves the effect that the circular movement of the control plate and the radial movement of the control cams 22 are converted into a rectilinear movement of the switching pin of the microswitch 23. This prevents the switching pin of the microswitch 23 from being subjected to flexural stressing from the side. This achieves the effect that the valve arrangement can be used for longer troublefree operation. The switching lugs 26 may be produced in an injection-molding process from plastic or in a punching process from metal. Instead of the microswitch 23, an inductive proximity switch may also be used. For this purpose, the switching lug 26 would have to be produced from a suitable material that influences the inductance of the proximity switch.

Also represented in FIG. 3 are two universal mounts 28, with which the microswitches 23 are fastened on the side wall of the receiving housing 7. Suitable shaping of these universal mounts 28 achieves the effect that the same microswitches 23 can be respectively used for different valve arrangements. One universal mount has, on an outer wall, fastening points for fastening on the inner wall of the receiving housing 7 and, on the inner wall, a multiplicity of further fastening points for fastening the microswitches or the inductive proximity switches which are being used in the valve arrangement as signal converters. The universal mounts 28 are simple-to-produce injection moldings which serve for bridging the distance between the spindle 15 and the side wall of the receiving housing 7.

In a side view of the receiving housing 7, a passage 29 is provided for leading through the supply lines or signal lines to and from the means 23 for sensing the valve position from the energy supply or to the signal display panel, respectively. Depending on the design of the means 23 for sensing the valve position, the lines may be electrical, hydraulic or pneumatic lines. For connecting these lines, a connecting part 13 is provided on the outer side of the receiving housing 7. The connecting part 30 serves not only as an interface for the line connections but also ensures, by the relatively large sealing area, good sealing off of the receiving housing 7.

Figure 4:
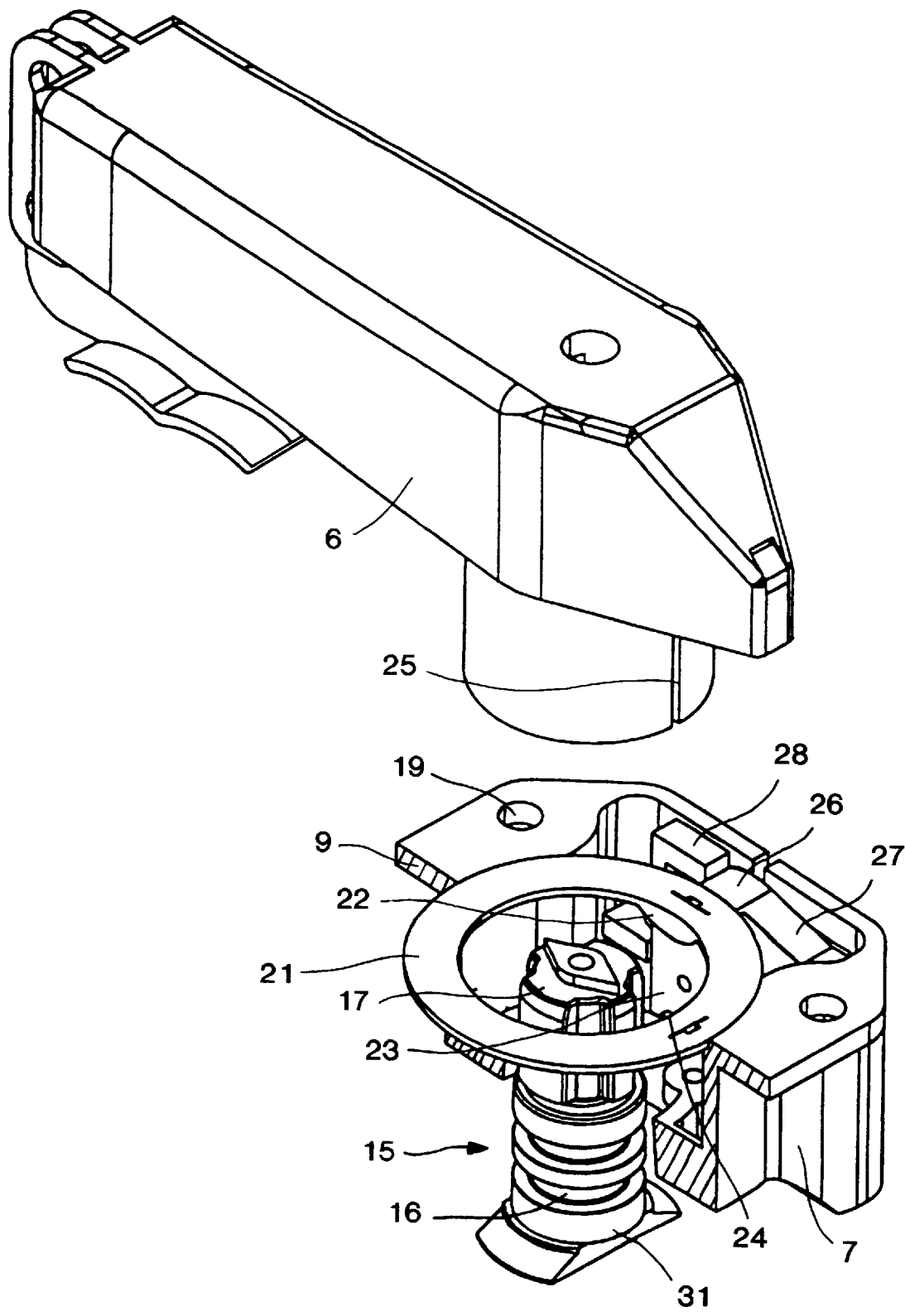
FIG. 4 shows a partially sectioned perspective representation of the valve arrangement according to the invention in one phase of assembly.

In FIG. 4, a detail from the valve arrangement 1 is represented in one phase of assembly. For a better view of the parts inside the housing, the receiving housing 7 is represented in sectioned form. The spindle 15 is connected at the first end 31 to the shut-off element, for example a ball cock. Arranged in the region of the second end 17 of the spindle is the control plate 21. Arranged in the region of the side wall of the receiving housing 7 is a universal mount 28 and, in it, a microswitch 23. The handle 6 has, in the region which is connected to the spindle 15, a groove 25, which interacts with the coupling lug 24 of the control plate 21. The receiving housing 7 with the microswitches 23 and the control plate 21 forms a compact arrangement, which can be easily adapted to existing valve arrangements by exchanging the universal mount 28. The overall height of the receiving housing 7 corresponds approximately to the length of the spindle 15 and is not higher than the space which is present in any case between the valve body and the actuating device 6.

What is claimed is:

1. A valve arrangement comprising a valve body with at least two connecting regions for connection to matching pipelines and a shut-off element for shutting off and opening the matching pipelines, the valve body for guiding a spindle, the spindle is connected effectively at a first end to the shut-off member and at the second end to an actuating device, and at least one means for sensing the respective valve position, wherein a receiving housing having a connecting flange provided with a recess for receiving the means for sensing the respective valve position wherein the housing encloses at least the lead-through region.

2. The valve arrangement as claimed in claim 1, wherein the receiving housing has an essentially concavely shaped base and is positively connected to an outer wall region of the valve body.

3. The valve arrangement as claimed in claim 2, wherein the receiving housing has on the side opposite the base the connecting flange.

4. The valve arrangement as claimed in claim 3, wherein a control plate with control cams for activating the means for sensing the respective valve position is arranged in the receiving housing.

5. The valve arrangement as claimed in claim 4, wherein the recess receives the control plate, the recess being in the form of an arc of a circle and coinciding with the outside diameter of the control plate.

6. The valve arrangement as claimed in claim 4, wherein the control plate has a coupling lug which interacts with a groove in the spindle for coupling the control plate to the spindle.

7. The valve arrangement as claimed in claim 4, wherein the control plate has a coupling lug which interacts with a groove in the actuating device for coupling the control plate to the actuating device.

8. The valve arrangement as claimed in claim 1, wherein a connecting part for connection of signal lines leads away from the means for sensing the valve position and the supply lines leading to the means are arranged on a side wall of the receiving housing.

9. The valve arrangement as claimed in claim 1, wherein the means for sensing the valve position comprises inductive proximity switches.

10. The valve arrangement as claimed in claim 4, wherein the means for sensing the valve position comprises electrical microswitches.

11. The valve arrangement as claimed in claim 10, wherein concavely shaped switching lugs are arranged between the control cams of the control plate and the microswitches in such a way that rotational movement of the control cams is converted into a rectilinear switching path of the microswitches.

12. The valve arrangement as claimed in claim 1, wherein a universal mount for receiving the means for sensing the valve position is connected to a side wall of the receiving housing.

13. The valve arrangement as claimed in claim 1, wherein the shut-off element comprises a ball cock.

14. A valve arrangement comprising a valve body with at least two connecting regions for connection to matching pipelines and a shut-off element for shutting off and opening the matching pipelines, the valve body further includes a lead-through region for guiding a spindle, the spindle is arranged such that it can be connected effectively at a first end to the shut-off member and at the second end to an actuating device, and at least one means for sensing the respective valve position, wherein a receiving housing for receiving the means for sensing the respective valve position encloses at least the lead-through region wherein a recess for receiving a control plate is provided in a connecting flange provided on the housing, the recess being in the form of an arc of a circle and coinciding with the outside diameter of the control plate.

15. The valve arrangement as claimed in claim 14, wherein the control plate comprises control cams for activating the means for sensing the respective valve position.

16. The valve arrangement as claimed in claim 14, wherein the control plate has a coupling lug which interacts with a groove in the spindle for coupling the control plate to the spindle.

17. The valve arrangement as claimed in claim 14, wherein the control plate has a coupling lug which interacts with a groove in the actuating device for coupling the control plate to the actuating device.

18. The valve arrangement as claimed in claim 14, wherein a connecting part for connection of signal lines leads away from the means for sensing the valve position and the supply lines leading to the means are arranged on a side wall of the receiving housing.

19. The valve arrangement as claimed in claim 15, wherein concavely shaped switching lugs are arranged between the control cams of the control plate and a plurality of microswitches in such a way that rotational movement of the control cams is converted into a rectilinear switching path of the plurality of microswitches.

20. A valve arrangement comprising a valve body with at least two connecting regions for connection to matching pipelines and a shut-off element for shutting off and opening the matching pipelines, the valve body further includes a lead-through region for guiding a spindle, the spindle is arranged such that it can be connected effectively at a first end to the shut-off member and at the second end to an actuating device, and at least one means for sensing the respective valve position, wherein a receiving housing for receiving the means for sensing the respective valve position encloses at least the lead-through region wherein a control plate with control cams for activating the means for sensing the respective valve position is arranged in the receiving housing wherein concavely shaped switching lugs are arranged between the control cams of the control plate and a plurality of microswitches in such a way that rotational movement of the control cams is converted into a rectilinear switching path of the plurality of microswitches.

21. The valve arrangement as claimed in claim 20, wherein a recess for receiving the control plate is provided in a connecting flange on the receiving housing, the recess being in the form of an arc of a circle and coinciding with the outside diameter of the control plate.

* * * * *